United States Patent [19]

Irwin

[11] Patent Number: 4,978,952
[45] Date of Patent: Dec. 18, 1990

[54] FLAT SCREEN COLOR VIDEO DISPLAY

[75] Inventor: Dean S. Irwin, San Diego, Calif.

[73] Assignee: Collimated Displays Incorporated, New York, N.Y.

[21] Appl. No.: 315,734

[22] Filed: Feb. 24, 1989

[51] Int. Cl.$^5$ ............................. G09F 9/00; G02B 5/14
[52] U.S. Cl. .................................... 340/795; 340/716; 340/794; 358/236; 358/55; 358/59; 358/241; 350/96.15
[58] Field of Search ............... 340/716, 794, 795, 783, 340/784; 358/56, 60, 62, 236, 230, 241, 55, 59; 350/345, 96.1, 96.15, 96.17, 96.2

[56] References Cited

U.S. PATENT DOCUMENTS

| | | |
|---|---|---|
| 3,569,614 | 3/1971 | Hanlon . |
| 3,716,658 | 2/1973 | Rackman . |
| 3,869,195 | 3/1975 | Aldrich et al. . |
| 3,899,786 | 8/1975 | Greubel et al. . |
| 3,994,564 | 11/1976 | Somogyi . |
| 4,009,488 | 2/1977 | Smith ..................................... 358/62 |
| 4,009,488 | 2/1977 | Smith . |
| 4,140,772 | 10/1979 | Bly ..................................... 340/783 X |
| 4,170,771 | 10/1979 | Bly ..................................... 350/345 X |
| 4,521,771 | 6/1985 | Alton . |
| 4,573,766 | 3/1986 | Bournay, Jr. et al. . |
| 4,678,285 | 7/1987 | Ohta et al. . |
| 4,717,949 | 1/1988 | Eichenlaur ..................... 340/716 X |
| 4,720,706 | 1/1988 | Stine ............................... 340/795 X |
| 4,799,050 | 1/1989 | Prince et al. ..................... 340/784 X |
| 4,818,983 | 4/1989 | Hara et al. ............................ 340/794 |
| 4,838,651 | 6/1989 | Pottharst et al. ............... 358/236 X |
| 4,870,484 | 9/1989 | Sonehara ............................. 358/59 |
| 4,878,122 | 10/1989 | Glenn ................................. 358/62 X |

Primary Examiner—James J. Groody
Assistant Examiner—Mark R. Powell
Attorney, Agent, or Firm—Darby & Darby

[57] ABSTRACT

A video display having a shutter assembly with apertures, optical guides extending behind the assembly and a group of different light sources channeling their light into each of the optical guides, respectively. The guides may be collimators which allow light to escape perpendicular to their front surfaces, which surfaces are located in back of the shutter assembly. The collimators have parabolic and hyperbolic mirrored surfaces facing each other within the collimator. Electronic control circuitry is provided to control the light outputs with a video input signal in relation to a horizontal sweep signal and to selectively make the shutter apertures transparent so as to expose a portion of the illuminated collimators in response to a vertical sweep signal. The intensity of the light source is varied to produce a high resolution, high speed video display.

53 Claims, 8 Drawing Sheets

FLAT SCREEN COLOR VIDEO DISPLAY

FIELD OF THE INVENTION

The present invention relates generally to a video system for displaying information and graphics and, more particularly, concerns flat screen displays useful as television screens or computer monitors.

BACKGROUND OF THE INVENTION

Televisions with cathode ray tubes (CRTs) create an image by sweeping an electron beam across a phosphorescent screen. After starting from the upper left hand corner and sweeping horizontally to the right edge of the screen, the beam is returned to the left edge, to start sweeping a new horizontal line beneath the previous line. During its return to the left edge of the screen, the beam is cut off to blank out the screen This scanning process is repeated 262 times to complete an entire "field". Typically, a second field is generated so that its scan lines lie in-between those of the previous field, the two fields defining a complete frame, which has 525 scan lines altogether. The process of scanning one field within the other is referred to as "interlacing" or "interleaving". The frames are repeated sixty times a second to avoid flicker and to give the appearance of a continuous moving image.

Fiber optics are thin plastic strands that carry light. One well-known form of fiber optic has an inner core and outer cladding which have different indexes of refraction. As a result, light introduced into a strand at one end is refracted so that it stays within the strand as it travels along its length to the other end.

Light emitting diodes (LEDs) are semiconductor illuminating devices which are also well known. LEDs can be made to emit light in a variety of colors and the intensity of this light can be controlled by the amount of electrical current passed through the device. LEDs can be switched on and off very quickly, but are too expensive to be made into a large color display for a television, which might require over 450,000 LEDs.

Liquid crystal displays (LCDs) do not produce light, they pass or block it under control of an electrical signal. The light entering the display is first passed through a polarizing filter and then through the LCD material. With a negative transmissive type LCD, the application of an electric field to the LCD material causes its molecules to be oriented to form another polarizer so the polarized light will be transmitted. When the field is removed, the polarization of the LCD material changes so that the light is blocked.

LCDs are inexpensive and have been used in small portable televisions. However, they have a poor gray scale and require additional light for color displays.

LCDs have been used to form a shutter assembly to allow light in selected areas to pass while suppressing other areas. However, the liquid crystal is not fast enough to allow a single picture element (pixel) of light through at a time to reproduce television horizontal sweep speeds. However, it can respond at vertical line frequencies.

Three major technologies available for displaying highinformation content from television signals are backlighted liquid crystal displays, gas plasma displays and electroluminescent displays.

Twisted-nematic liquid crystal displays are both voltage-and time-dependent and are limited by the response time of their materials. As a result, active-matrix liquid crystal displays were developed to improve the response time, the contrast and the angle viewability. However, active-matrix liquid crystal displays require very high resolution photo lithography steps and so are both more complicated and expensive to manufacture than are twisted-nematic liquid crystal displays.

Super twist, backlit LCDs are suitable for applications that can tolerate slower response time and narrower viewing angles. Those applications demanding high contrast, wide viewing angles and fast response rely on the other technologies, e.g. gas plasma and electroluminescent displays, which are much more expensive to manufacture.

For large panel applications, back-lit liquid crystal displays require a large amount of power, thereby shortening the battery life of the battery used to power the illumination of the display.

It would therefore be desirable to use liquid crystal displays in a video display which requires less power for illumination to achieve the same or better illumination than existing video displays. It is also desirable to use such a video display for television applications such that there is no compromise in performance despite the slower response time of liquid crystal displays.

In accordance with the present invention, a high resolution video display for textual and graphic information includes four fundamental components: a horizontally swept light source, light guides, a shutter array, and electronic driving circuitry. The light source is operable, under control of the driving circuitry to produce light which sweeps horizontally at a controllable rate. The light source may include different colors. The light guides receive the light from the light source and convert it to a vertical column of light which is one picture element wide. The shutter array comprises a plurality of elongated horizontal shutters positioned in vertical alignment so as to intercept the light from the light guides. The electronic driving circuitry responds to an electrical signal (e.g. a television signal) and produces a first control signal which sweeps the light source at the horizontal scan rate and a second control signal which opens and closes the shutters at the vertical scan rate. As a result, the shutters need only be opened and closed at a relatively slow speed corresponding to the vertical scan rate.

In an illustrative embodiment of a color display, a horizontal sweep is formed by a linear arrangement of groups of three different primary color light sources illuminating vertical optical collimators. By selecting combinations of different color light sources, the columns may be given a particular color of light at a television horizontal scan speed.

The optical light guides are preferably in the form of collimators, each having a transparent front surface which has the width of a pixel. A plurality of these guides are arranged side-by-side to form the display. The optical guides are formed so as to internally reflect and/or refract light so the light can escape out of the light guides only through the front surface.

The light sources may provide either monochrome or multiple color. The light sources may be light emitting diodes (LEDs), lasers, vacuum tube light emitters, or incandescent or fluorescent lamps. LEDs are the preferred light sources.

Movable mirrors, e.g. rotatable mirrors or piezoelectric flapper mirrors, can be arranged between the light sources and the collimators to reflect the light rays from the light sources to each of the entrance surfaces of the collimators. The mirrors could also direct the light directly to the shutter assembly.

The shutters may be elongated linear liquid crystal display elements formed one above the other. These may be of the twisted-nematic, N cap or other type.

When LEDs and LCDs are used, the electronic circuitry drives the groups of LEDs to illuminate the collimators or light guides and sequentially allows the light to pass through the apertures of the LCD shutter assembly. The electronic circuitry processes video chromatic input signals so that the intensity of the light emitted from the LEDs can be varied in response thereto and the light from different colored LEDs of each group is combined together to produce any color called for by the input signal. Thus, the groups of LEDs are typically actuated in sequence to provide a horizontal sweep of the display and the apertures of the LCD shutter assembly are actuated in sequence to provide a vertical sweep of the display.

In a preferred embodiment, the collimators may have two internal mirrors. One mirror is convex and the other mirror is concave. Preferably, the convex mirror is parabolic and the concave mirror is hyperbolic so that the light rays reflecting off the hyperbolic mirror will pass through the front surface of the collimator parallel to each other and perpendicular to the front surface.

BRIEF DESCRIPTION OF THE DRAWINGS

For a better understanding of the present invention, reference is made to the following description and accompanying drawings, wherein.

DESCRIPTION OF THE PREFERRED EMBODIMENTS

Figure 1:
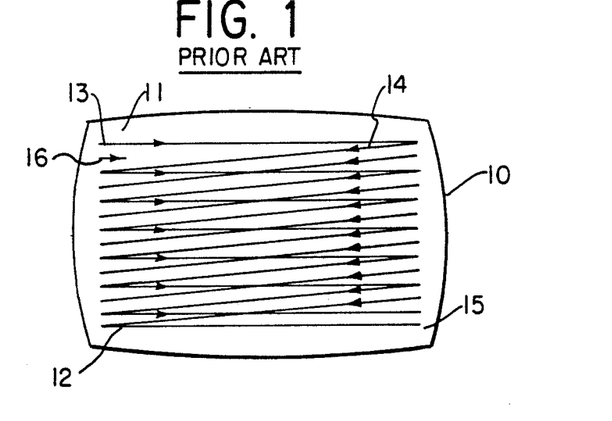
FIG. 1 shows a schematic front view of a prior art television screen illustrating scanning and interlacing of an electron beam of a cathode ray tube.

FIG. 1 shows the scanning and interleaving of a cathode ray tube beam of a known television receiver. The beam produces an image on the screen 10 by tracing out a first field 11 during a first vertical scan, and then tracing out a second field 12 during a second vertical scan. The fields 11, 12, in combination, constitute a frame and the second field 12 is interleaved or interlaced within the first field 11. The beam starts at the upperleft most corner 13 and sweeps across horizontally (and perhaps slightly downward) to the upper rightmost corner in a generally horizontal line. The beam then returns to the left side following a retrace path 14 to start a new line below the previously made horizontal line. During the retrace path the beam is normally cut off or blanked so no trace appears on the screen. This process continues down the screen until field 11 is completed at the rightmost and lowest point 15. The beam then retraces to point 16 at the leftmost point on a line between the start point 13 of the first line of field 11 and the second line of that field. During this vertical retrace, the beam is also cut off.

Figure 2:
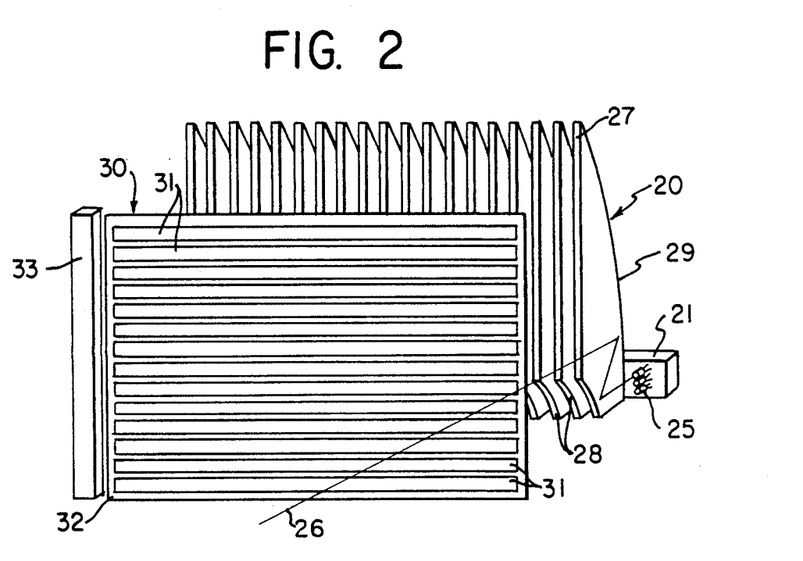
FIG. 2 shows an exploded, perspective view of a video display in accordance with the present invention, the various components being shown separated from each other for the sake of clarity.

FIG. 2 shows the collimated video display of the present invention which can produce high resolution full color or monochrome light emitting images at high speeds from electronic signals. The display uses high speed light sources to generate the light. The sources may be lasers, laser diodes, light emitting diodes, vacuum tubes, incandescent lamps (with acoustic fluid or other suitable modulators) or other types of emitters that are capable of high speed modulation. If there are light sources of different color, they are combined and focused into light guides that produce discrete columns of parallel rays of light that are directed towards a shutter array. The shutter array selectively passes a horizontal section of the collimated light rays.

The display has four fundamental components, i.e. light sources 25, light guides 20, a shutter 30, and electronic driving circuitry 21,33. Other components are required in order to realize a working device, including a power supply and signal conditioning circuitry, but these are well known. The four fundamental components must be coupled to each other either electrically or optically, and must be mechanically mounted in reasonably close proximity to each other.

The light sources convert the electrical signals to light of the appropriate color or hue at video speeds. The first and foremost criterion for the light emitters 25 is that they must be capable of being modulated at high speed with a reasonable degree of control over the intensity.

The light must be capable of being focused into the light guides, and therefore must reasonably approximate a point source. The light sources must also be a shape and size that allows them to be placed side by side for input to light guides arranged at a 0.010 inch minimum spacing between them.

The brightness of the display is derived from the light sources. The maximum display output is approximately the sum of the average output of the light sources multiplied by the efficiencies of the light guides, shutter, and a ground glass diffuser surface, where used.

The light guides, e.g. collimators, convert each point light source to a vertical column of parallel light rays. Reflection is the means of control. The transmission medium may be air, glass or plastic and the collimators perform at up to 70% transmissivity. The transmission medium may use a combination of reflector types.

In the preferred embodiment of FIG. 2, a video and synchronization signal is applied to the electronics unit 21. The signal is separated into horizontal, vertical and video (including chrominance or color) components.

Connected to electronics unit 21 are sets of three light emitting diodes (LEDs) 25. Each of these diodes emits light of a different color, i.e., red, green, yellow or blue. The diode sets are arranged horizontally and there is one set for each horizontal row of picture elements (pixels) of the display.

LEDs are common in geometries of less than 0.015 inches square. The LEDs are efficient, so that high brightness can be achieved with relatively low power and a minimum of heat generation. LEDs have a lifetime of over 11 years of continuous operation, and do not degrade in storage. They are rugged and relatively insensitive to temperature changes.

In operation, the horizontal sweep signal extracted from a television signal is applied to a circuit which has an output line for each group of LEDs (including sources of different color). The sweep signal preferably causes the output lines to be activated in sequence at the sweep rate. The cathodes of each color LED are connected to the output lines, which act to switch the cathodes of each color LED 25 to a low level. The anodes of the LEDs are provided with the color signals such as those corresponding to red, green and blue intensities. Each color LED is fed from the corresponding color signal and thus the LEDs are energized from left to right at the horizontal scan rate to emit the color dictated by the color signal and horizontal sweep signal. In some instances, the color emitted is a color achieved by combining the outputs of two or all three of the diodes at intensities determined by the chrominance signals.

Figure 3:
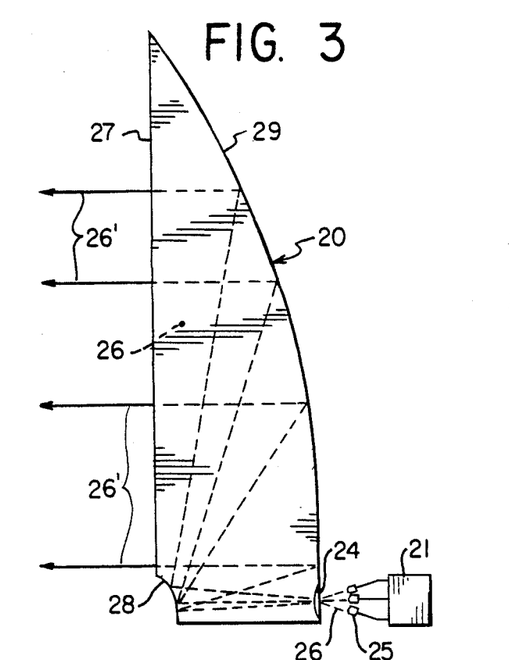
FIG. 3 shows a schematic side view of the collimator and LED depicted in FIG. 2, illustrating the reflection paths of the light.
Figure 4:
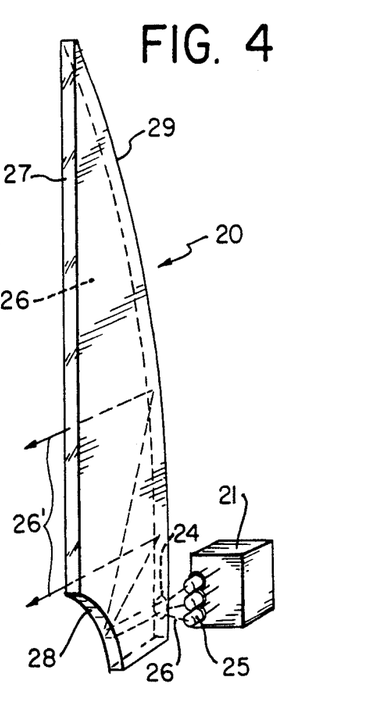
FIG. 4 shows a perspective front and side view of FIG. 3.

Light 26 from the LEDs 25 is focused or channeled into respective collimators 20, one for each set of LEDs or column of pixels. The light enters through an entrance, e.g. lens surface 24, and diverges by internal reflection off mirrored surfaces 28,29 on the collimator edges as shown in FIGS. 2-4. The LEDs may be focused into the collimators simply by placing them close to the collimator inputs with the maximum beam point aimed properly. As an alternative, the LEDs may have small reflectors to focus the light into the collimator input. The reflectors may also gather light that is emitted from the sides of the LEDs that otherwise would have been lost. These reflectors may be integral with the LEDs or even made of the adhesive that bonds them to their substrate. The copper bonding pads of a hybrid may be "dimpled" to form a reflector prior to the LED being mounted. The conductive adhesive or solder may also be formed into a reflector in a similar manner.

An oil, gel, or other liquid may be used to focus more of the light from the sources to the collimators. The fluid acts as a lens and mirror keeping the light output from interfering with the neighboring sources and directing it to the input of the respective collimator. The fluid could be applied to individual units or to the entire assembly, depending on its properties and the construction of the collimators themselves.

As a further alternative, the LEDs may be situated within a small cavity at the input to the collimator. The cavity would then be filled with material to secure the LED. This coupling technique is very effective at preventing interference and providing excellent optical coupling.

More than one LED may be used for each color of each collimator to increase the brightness of the display. The LEDs would be connected in series, and the collimators would be made to accept the input. The drive circuitry would not need much, if any, modification to drive multiple LEDs.

Multiple collimator sets with single or multiple LEDs can be used. One system could be used for the lower portion of the display and one for the upper portion, in a two block display. The collimators would be aligned vertically and in abutment, to eliminate any gaps. This would involve one set of collimators and LEDs for each section.

The multiple collimator sets greatly increase the contrast as well as the brightness of the display, because those sections not being horizontally addressed could be turned off. The amount of light from each LED would be concentrated in a smaller area of the display, and therefore would be brighter.

Mirrored surface 28 of the collimator is a convex parabolic and mirrored surface 29 is a concave hyperbolic, so that the light rays 26' reflecting off the mirrored surface 29 emerge through the front surface 27 of the collimator parallel to each other and perpendicular to the front surface 27. Thus, the mirrored surfaces are arranged in an offset relationship. After emerging from the front surface 27, the light rays reach the shutter assembly 30 (FIG. 2).

Figure 5:
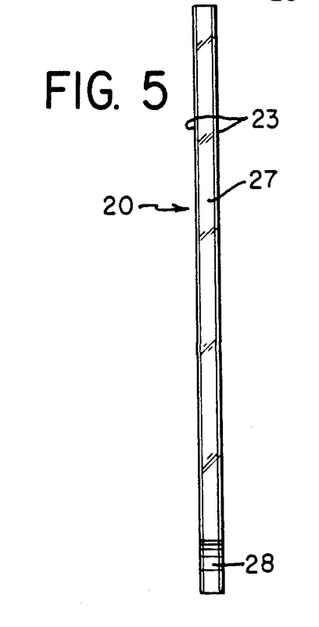
FIG. 5 shows a front view of the collimator of FIG. 3.

The side surfaces 23 of the collimators act to reflect or refract the light from the source as the light travels in the core 26 (FIG. 5). This acts to keep the light from neighboring collimators from interfering and permits utilization of as much of the output light as possible. The collimators may be made of glass or plastic material, which is available in a variety of different indices of refraction with excellent optical characteristics. They are shaped, polished, and aluminized to form the mirrors on surfaces 28,29. Instead of a parabolic and hyperbolic pair, the mirrors can be circular or elliptical. The collimators can be injection molded from plastic or molded of high quality glass.

FIGS. 3-5 show the details of the collimator. The collimator is thin (e.g., less than 0.01 inches) including its core 26 and cladding 23 which are sandwiched together. The core 26 is formed to allow for the transmission of light without much loss or dispersion. The cladding 23 may be made out of a reflective material. The cladding 23 may alternatively be made of a transparent material. However, if the cladding 23 and core 26 are both transparent, they should have different indices of refraction. If the cladding is made denser than that of the core 26, light is prevented from escaping through the cladding 23 by refraction. This also prevents light from outside the cladding from interfering with the light being collimated. The collimator, both cladding and core, may be made of a solid transparent material, such as plastic or glass material. As a solid transparent material, the core 26 helps to support the mirrored surfaces 28,29. Instead of a solid transparent material, the core 26 could be an empty space, gas or liquid.

Light from the collimators passes through apertures 31 of the LCD shutter assembly 30. These apertures 31 span from one side of the LCD shutter assembly to the other. The LCD shutter assembly is arranged in front of and placed against the collimators 20 to minimize light loss. Thus, a high resolution display of pixels is achieved.

Each of the elongated shutter apertures 31 is preferably a negative transmissive type of liquid crystal, but the LCD may be of any type. The apertures 31 become transparent with the application of a voltage to the aperture electrode 32 with a negative transmissive type.

The aperture speed requirement of the preferred embodiment is 100uS at a minimum in order to display 500 lines of non interleaved display at 30Hz. Ncap type crystal may be used to increase speed, lower cost, increase the brightness, and increase the size of the active display. However, this type crystal provides lesser contrast. Thus, a high resolution display of pixels is achieved.

The transmissivity of the shutter assembly in the on and off modes is an important factor in determining the performance of the system. Also, the contrast of the system must be lower than the contrast of the shutter device, making single layer liquid crystal elements minimally suitable for this application. An ideal contrast ratio would approach 100:1, usable contrast ratios would be in the 5 to 10:1 range.

The contrast of the display is highly dependent on the characteristics of the shutter performance. The slower the aperture movement, or longer the transition time, the lower the overall display contrast. The driving circuitry will be taxed to accommodate a display with poor shutter performance.

The shutter system must be manufacturable in a large size with a variety of aspect ratios. The apertures must be capable of being closely spaced, and the actuation means must not interfere with the transmission of the light.

The LCD could be a smectic C-type for very high speed displays and for large glass. Manufacturing LCD panels is done with laser sealed edges and feed throughs for connection to the back. These panels may be combined to produce very large displays in a modular fashion. The LCD may use transparent metal electrodes to improve speed, or it may use highly conductive metal connectors that run the entire length of the apertures.

A viewer may look at the shutter directly. If the light rays emerge parallel to each other, then a diffuser screen or scattering plate is placed in front of the LCD shutter assembly for a viewer to look through. Etched glass or panel frosting may be used for the viewer to look through to improve the viewing angle.

The shutter electronics 33 drives the shutter assembly with pulses. The pulses open and close the shutter apertures 31 to modulate the collimated light according to the vertical scan rate of the video signal. The spaces between the apertures is minimized to enhance clarity. This modulation may be done, for instance, sequentially, by every other one, or in any desired manner to maximize contrasts.

Figure 6:
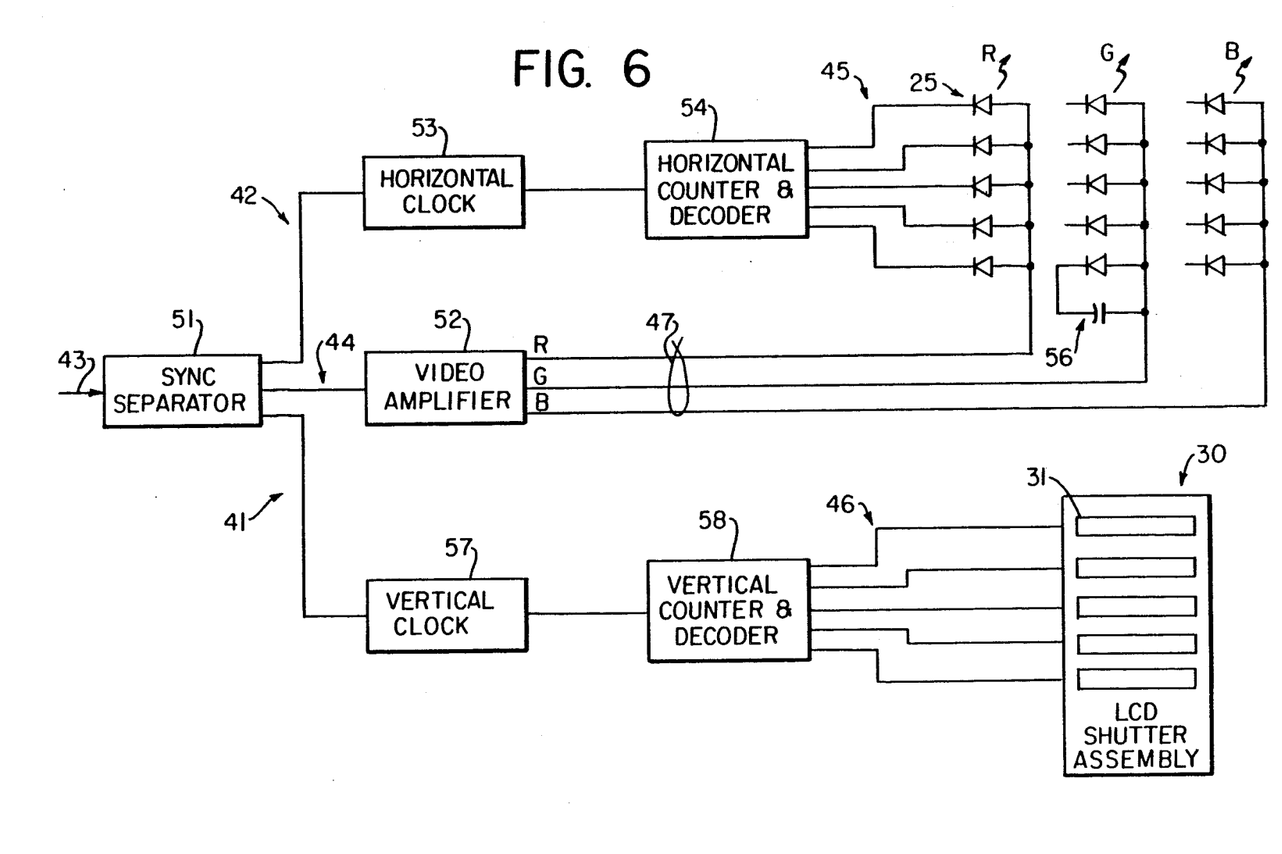
FIG. 6 shows a block diagram of the electronics required to operate the video display of FIG. 2.

FIG. 6 shows a block diagram of the electronic circuitry which processes a composite video signal 43 into signals suitable for the LEDs 25 and the LCD shutter assembly 30. The driving circuitry includes a mixture of analog and logic circuits. The logic is designed so that a number of different driving sequences can be employed. The power requirements and the shutter performance will determine the complexity of the driving circuitry. Since the speed of the vertical sweep is low, standard transistor-to-transistor logic (TTL) circuitry to control may be used for that application.

The horizontal control circuitry operates at very high speeds and power levels. The efficiency and type of light emitter plays a large role in determining the type and complexity of the actual circuitry. LED emitters require large current capacity in both the switching elements as well as the analog counterparts. They also require extra circuitry in order to generate persistence or other special control techniques for improved light output. This type of circuitry is most easily constructed on a single chip by known custom technology or else mounted on a semiconducting disc with some components silk screened onto aluminum by known hybrid custom technology.

Referring to FIG. 6, the composite video signal 43 is first fed into a synchronization separator (sync circuit) 51 which separates the input signal into a vertical pulse signal 41, a horizontal pulse signal 42 and a video intensity signal 44 (chroma and luminance).

The video intensity signal 44 is fed to video amplifiers 52, which convert the chroma and luminance signals into amplitudes corresponding to red R, green G and blue B intensities. The video amplifiers 52 convert the intensity signals into current drive signals for each anode of each color LED, which signals appear on lines 47. The LED drive circuitry is designed to drive a high capacitance load.

The horizontal clock circuit 53 is triggered by the horizontal pulse signal 42 from the sync circuit 51. This horizontal clock circuit 53 divides the duration between horizontal sync pulses 42 into a number of sub-intervals corresponding to the number of groups of LEDs, and provides an appropriate horizontal scan frequency. This corresponds to the horizontal resolution. The clock frequency is adjustable to allow for horizontal sizing requirements, i.e. by means of a change in oscillator frequency. Horizontal centering is not required because the image must start from the left side as is governed by the physical position of the LEDs and the trigger pulse from the sync circuit 51.

The clock pulses from the horizontal clock circuit 53 are counted by a counter circuit 54, which decodes the counted signal to activate any desired number of decode signal lines 45 leading to the cathodes for groups of LEDs 25. The number of decode signal lines may correspond to the number of groups of LEDs.

The decoded signals are buffered to drive the cathodes of the LEDs 25. The buffering is done with open collector transistors so as to electrically isolate the LEDs entirely from the rest of the circuit when they are not activated. An LED becomes activated when the decoded signal is present on the cathode and a video signal is simultaneously present on the anode.

Figure 7:
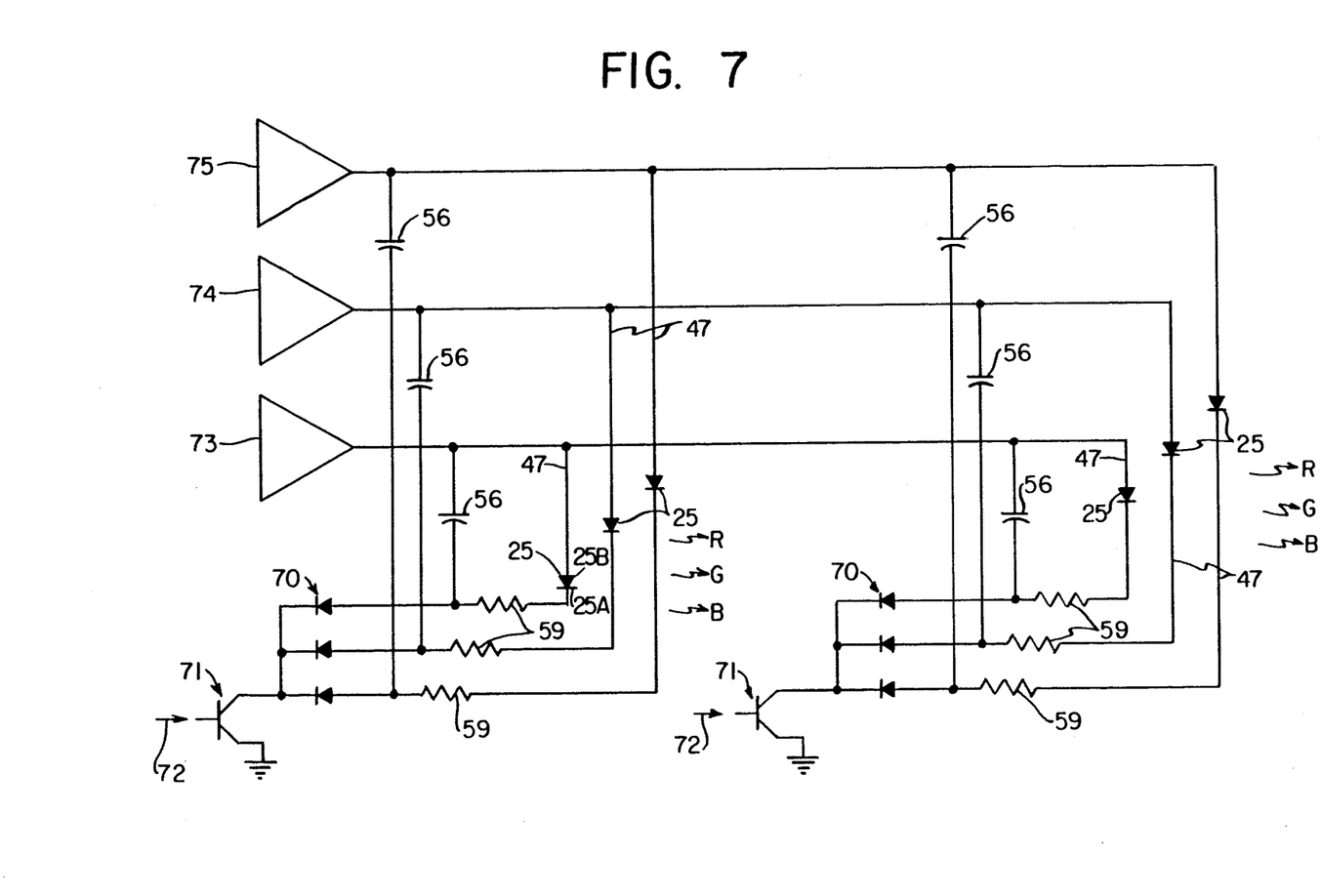
FIG. 7 is a schematic of the LED drive circuitry of FIG. 6 shown in greater detail.

Buffering is illustrated in greater detail in FIG. 7. Video buffers, i.e. blue 73, green 74 and red 75, of the video amplifiers 52 of FIG. 6, transmit video signals of sufficient magnitude for activating respective LEDs 25 at the anode side 25B. Driver transistors 71, which receive the decoded horizontal signals 72 of circuit 54 in FIG. 6 and activate the LEDs 25 at their cathode side 25A. Limiting resistors 59 are provided to avoid burning out the LED diodes 25 due to excess current. Decoupling diodes 70 are provided to effectively electrically isolate respective LEDs from the circuit when they are no longer being activated through the driver transistors. Holding capacitors 56 provide persistence of illumination of the LEDs 25 after electrical isolation takes place.

Holding capacitors 56 keep the LEDs "on" for a short period of time after the electrical isolation takes place so as to enable the colored light from the group of LEDs to be delivered to the viewer. The holding capacitors 56 allow the collimated video display to more closely approximate the look of a typical CRT and to increase the light output of the display. The capacitor will not interfere with the operation of the other LEDs because of the open collector drive system. Only one holding capacitor 56 is shown in FIG. 6 for the sake of clarity, but there is actually one for each LED as indicated in FIG. 7.

The vertical clock circuit 57 (FIG. 6) is very similar to the horizontal clock circuit 53. It is triggered by the vertical signal pulses from the sync circuit 51. A clock in circuit 57 divides up the vertical sync pulse 41 by the number of apertures in the LCD shutter assembly 10 to provide a clocked frequency of vertical pulses. This corresponds to the vertical resolution. The vertical clock frequency can be adjusted to allow for vertical sizing. A vertical centering control is not required because the signal and the image must start from the top and the physical location of the shutter apertures 31 is fixed.

These clocked vertical pulses are counted by a counter and decoder circuit 58 which counts the number of pulses and decodes the counted signal in order to sequentially activate, at any one time, only one of the total number of vertical decoded signal lines. These signal lines correspond to the apertures 31 in the LCD shutter assembly or may correspond to more than one line to provide for overlay or interleaving of scan lines.

The vertical decoded signals are buffered to directly drive the apertures 31. The buffering is achieved with an active totem pole transistor arrangement which provides the greatest speed for opening and closing the apertures 31.

As described, the collimated video display is a flat, lightweight, low power, high speed, high resolution, full color display which utilizes a combination of liquid crystal displays, optical collimators and light emitting diodes. The slower, vertical sweep in a typical TV screen is accomplished with the LCD elements and the higher rate horizontal sweep is accomplished by switching LED elements. Using internal reflection, the optical collimators expand the light from the LEDs to the vertical size of the shutter assembly or display. Electronic circuitry conditions a normal television composite video signal to provide the signals used by the LED and LCD elements of this display.

By sequentially switching across the groups of LEDs for instance, a sequential horizontal sweep of the display is created. By sequentially switching down the stack of LCD apertures, a sequential vertical sweep of the display, interlaced if necessary, is created. Thus, a full color or monochrome, flat screen display is formed from a conventional broadcast television signal. Of course, the switching need not be sequential; rather any desired order can be used (e.g. to improve contrast).

The present invention has many intrinsic advantages over CRTs. The pixel addressing mechanism for the CRT is serial, and requires retrace blanking and delays. The present device addressing mechanism is pseudorandom, and is compatible with conventional enhancement methodologies. It can also use the blanking periods for persistence in keeping the LEDs on to increase the overall light output.

The shutter apertures are liquid crystal, and therefore have a certain delay before the crystal actually changes. The liquid crystal structure, if it is of the twisted-nematic type, mechanically twists when it is changing state, and the transmissivity of the aperture changes with it. It is possible to use this latency to increase the brightness without a sacrifice in resolution or speed.

Also, the present arrangement is capable of random addressing of apertures or lines, and pixels (LED groups) within that line. It is also possible to open more than one aperture at a time.

The LEDs may be driven with circuitry that stores information for a line. The energy representing this information is then discharged into the LED devices for a period, determined by the circuitry, during which the entire shutter aperture is open. The stored information is then overwritten during the next access period. Information passed to the next aperture down in the vertical shutter could cause distortion, but it can be kept at a minimum. This type of distortion results in a lower contrast display, not lower resolution.

For greater intensity and definition, the LEDs may be driven with circuitry that will operate them past their "linear" region in LED burst modes. The "linear region" is represented by a flat area on a curve plot of input power versus output power for LEDs. LEDs require that a threshold voltage level be reached first before there will be any light power output. When the threshold is reached, there is a sudden surge in light output power. At the opposite extreme, there comes a point at which the amount of output power tapers off despite steady increases in input power. In between these two extremes is the "linear region". The light output of an LED is close to proportional to the drive current within the range of the "linear region". This range is from almost zero to near the rated average current of the device. Thus, the LED can be operated at higher currents with lower duty cycles in order to deliver maximum brightness. The circuitry can be tailored to provide a reasonably linear light output. However, in this mode, the life of the LED is decreased and the spectral output is changed, but they may be within tolerable limits.

Two apertures may be opened at the same time for twice the aperture sweep duration. This may be accomplished by alternating each frame to simulate interleaving, and at the same time the intensity can be increased without loss of contrast or resolution. The shutter drive circuitry requires the independent and individual drive capability for this function.

Shutter overlap using the inherent latency of the crystal can be exploited through the use of delay and prefiring. The shutter apertures may be opened in a wave-like manner. This provides greater brightness with a sacrifice of contrast and color purity.

A triple aperture method uses a very slow time base to open an aperture during normal or interleaved operation to provide greater brightness. This results in a loss of resolution, but not contrast. Very high brightness light sources allow multiple layer shutter assemblies to be used for greater contrast. This technique employs two identical shutter assemblies that are controlled with the same circuitry. The brightness would be reduced considerably, but the contrast could be increased by a great amount.

The potential performance of the present system may be enhanced by changing the electronic driving techniques. The speed, contrast and brightness may all be improved by changing the way the shutter apertures and light sources are controlled.

As an alternatives to the LEDs, a vacuum tube may be used as the light source. The tube consists of three indirectly heated cathodes, one grid for each color, an anode area, and three colored phosphor coatings running the length of the tube. The tube can be as small as $\frac{1}{4}$ of an inch in diameter, and from one to three feet in length. This type of emitter offers lower cost and higher brightness than LEDs, but would be less rugged, have a shorter life, and be more difficult to interface with the collimators.

A vacuum tube light emitter is much easier to drive because the current is only required by the analog section of the circuit. The switching section is driven with very low power devices. Persistence is achieved with the proper selection of existing phosphor technology. Custom or semicustom integrated circuit fabrication methods are most suited for the vacuum tube drive circuitry.

Figure 8:
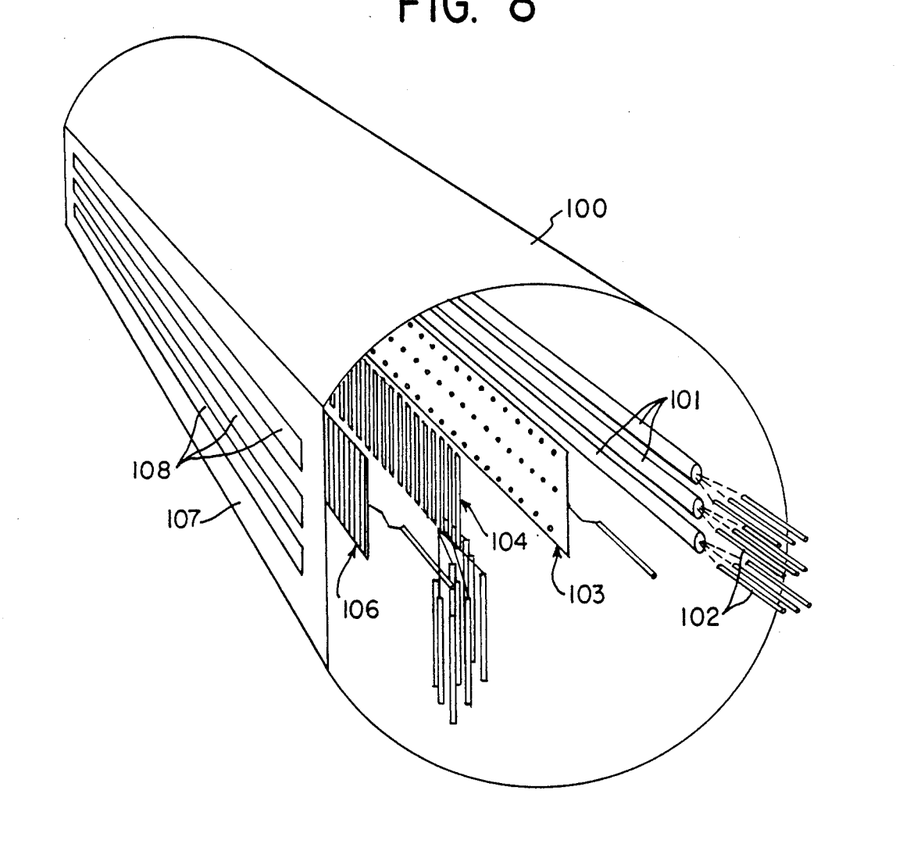
FiG. 8 is a perspective view of yet another embodiment showing a vacuum tube emitter.
Figure 9:
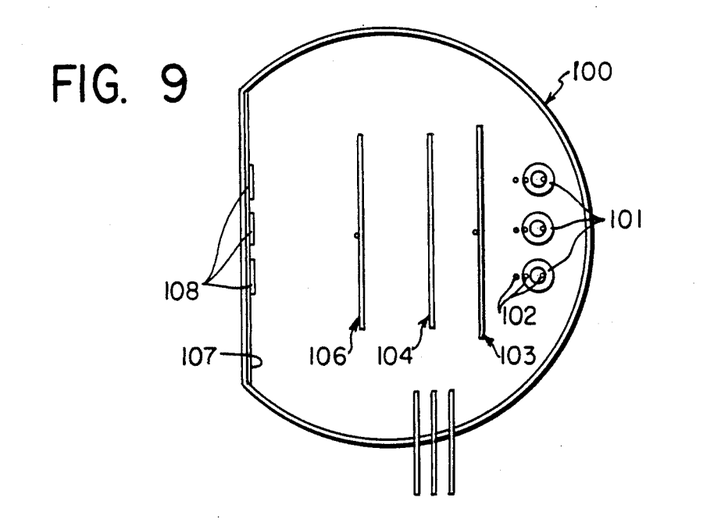
FIG. 9 is an end elevational view of the embodiment of FIG. 8.
Figure 10:
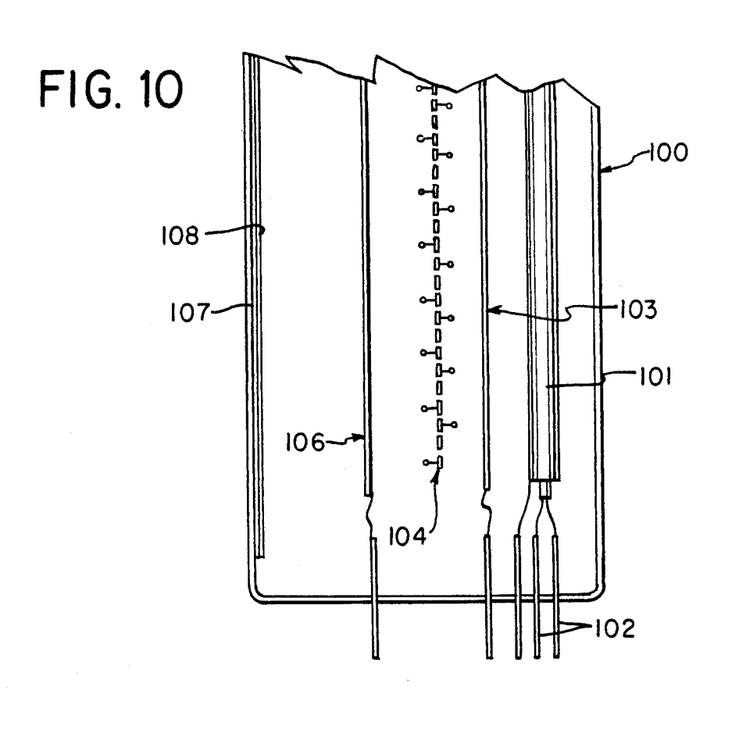
FIG. 10 is a partially broken top view of the embodiment of FIG. 8.

FIGS. 8-10 show a tri-color light emitting vacuum tube with multiple control grids 104 oriented in a matrix pattern with respect to the three cathodes 101 with heaters. Connectors 102 connect the heaters in the cathodes with outside circuitry (not shown) for varying the intensity of the electron beams eminating from the cathodes with respect to video chromance signals 44 of FIG. 6.

The tube includes a glass envelope 100 enclosing an evacuated area. The three cathodes 101 are associated with the three phosphor coatings 108, each phosphor coating providing a different color of light when struck by electrons from the respective cathodes. A focus electrode and ion trap 103 is provided to allow only narrow beams of electrons, e.g. one for each collimator, to pass through its apertures.

By controlling the activation of the control grids 104, only selected electron beams are permitted to pass by the control grid. Each control element of the control grid is activated to set up an opposite charge to block the electron beams in synchronism with horizontal sync pulses 42 of FIG. 6. A suppressor grid 106 is activated to slow the flow of electrons toward the anode coating 107 to ensure that the electrons impinge on the respective phosphor coatings 108 with the proper energy to give the desired intensity set by the luminescence signal.

The control grid 104 is arranged in correspondence with the collimators (not shown) so that illuminating selected areas of the phosphor coating will permit light to enter only corresponding collimators. Varying the flow of the electrons emitted from the cathodes (e.g. in response to video intensity signals 44 of FIG. 6) affects the type of colors that will be achieved from the excited phosphor coating; controlling the control grid selectively will determine which areas on the phosphor coatings will be struck by the electrons in alignment with desired collimators (e.g. in response to horizontal sync pulses 42 of FIG. 6).

Figure 11:
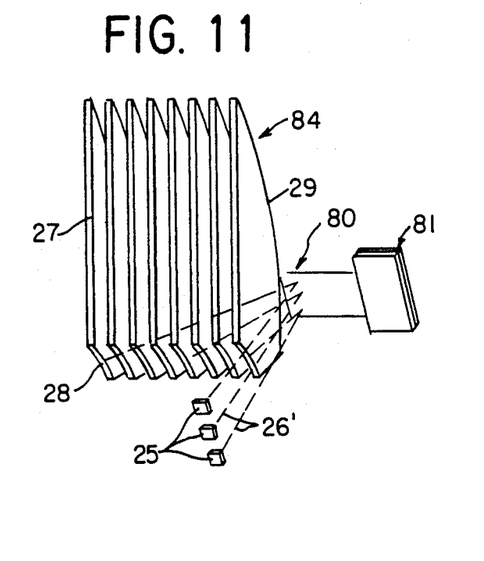
FIG. 11 is a perspective view of another embodiment showing a flapper mirror concept.
Figure 12:
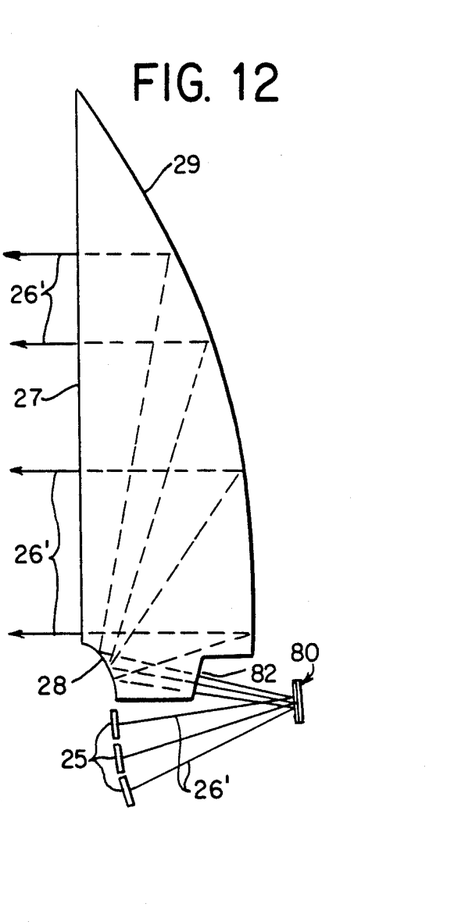
FIG. 12 is a right side elevational view of FIG. 11.
Figure 13:
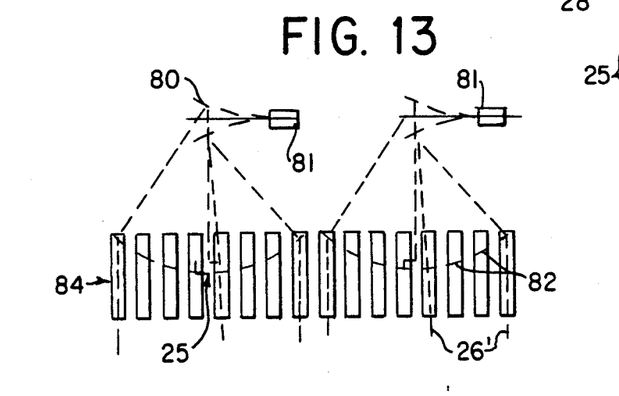
FIG. 13 is a top view of FIG. 11.

FIGS. 11-13 depict an embodiment employing flapper mirrors 80. These flapper mirrors may be made of flexible polyvinylfluoride sheets. Flapper mirrors reduce the number of LEDs required because a flapper mirror can focus light from one group of LEDs 25 (e.g. red, blue, green) into each of a set of collimators 84 individually. The mirrors may be of the piezoelectric film type that are driven to move in response to electrical signals from separate drive circuitry that is synchronized with the LED drive of FIG. 6.

FIGS. 11-13 show a flapper mirror 80 held in a mirror holder 81 that has an electrical connector. The piezoelectric flapper mirror 80 is in motion for sweeping the light rays 26' across the width of the display of collimators 84.

Each collimator 84 has a hyperbolic mirrored surface 28 and parabolic mirrored surface 29 as in the embodiment of FIG. 2. Each collimator also has a differently angled cut away area 82 at each of the respective entrance surfaces to accommodate entry of the light rays 26' into the collimators 84 after reflection off the flapper mirrors 80 so that the light rays will refract axially along the length of the collimator toward the mirrored surface 28. Together, the cut away areas appear to form the outline of an arc.

A rotating scanning type mirror may also be used. It is rotated so as to reflect light (e.g. from lasers) to the cut away areas 82 of the collimators, respectively, so that the light sweeps across the width of the display.

Figure 14:
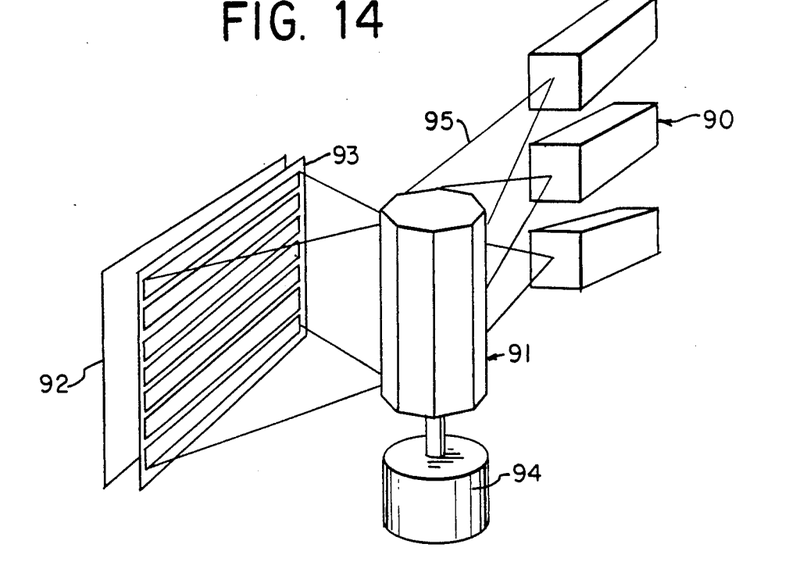
FIG. 14 is a perspective view of still another embodiment showing a laser scanning technique.
Figure 15:
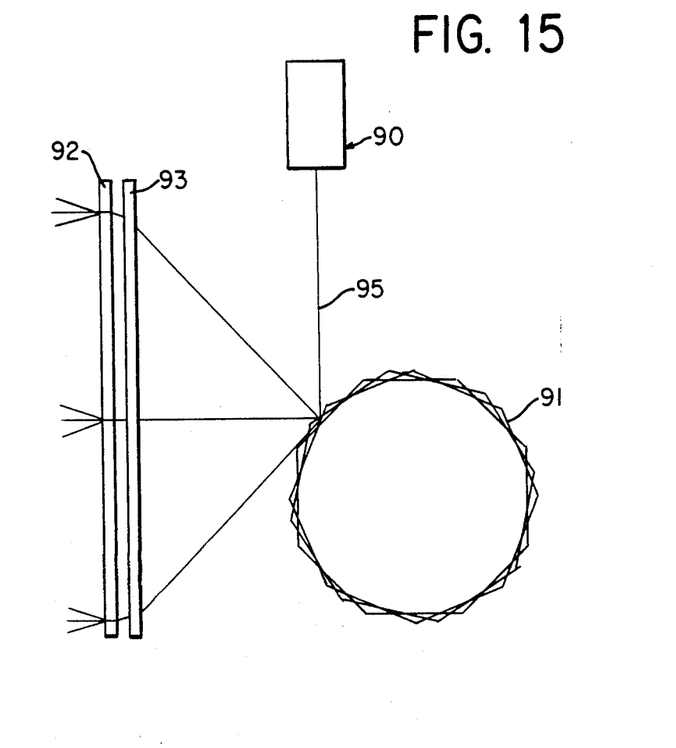
FIG. 15 is a top view of the embodiment of FIG. 14.

FIGS. 14 and 15 show a rotating scanning type mirror which is used for lasers, but which does not employ collimators.

Modulated lasers 90 emit colored light beams 95 at a rotating scanning mirror 91. The intensity of the light beam varies in response to video chromance signals, e.g. in a manner similar to varying the light intensity of the LEDs in response to video chromance signals 44 of FIG. 6. The light beams 95 are vertically diverged as they leave each laser (e.g. by diverging the light with lenses at the exit of each laser). The divergent light beams from the lasers mix with each other to provide a desired color intensity of light which is then reflected off the rotating scanning mirror 91 to strike a shutter 93 located across the height of the display.

The mirror 91 is rotated by a motor 94 driven in response to separate electronic circuitry that is synchronized with the LED drive of FIG. 6. By so driving the motor 94 to rotate the mirror 91 (e.g. with respect to horizontal pulses 42 of FIG. 6), the light will sweep across the width of the display. Light passing through the shutter 93 emerges through etched glass 92, which diffuses the light. FIG. 15 shows the mirror 91 superimposed on itself in three different positions during rotation, causing the laser light to strike the shutter at three respective areas across its entire height.

The rotatable mirror 91 is shown extending vertically to a height of the shutter, but other orientations and configurations for the mirror are also possible (e.g. angling the mirror). Three lasers 90 are shown, each emitting a different color (e.g. red, blue, green), but a single laser could be used instead to produce a monochrome display. The shutter 93 is the same as the shutter assembly 30 of the embodiment of FIG. 2 and is controlled in a similar manner.

Non linear optical transistors (media that acts as a light valve using incident light as the switching signal) may be used as shutters and also as valves for the collimators in the case of a single light source. The incident light dependent devices are driven with some of the unmodulated primary light source, or with other secondary sources.

The entire assembly may be grown from silicon with a variety of doping stages. The shutter, collimators, LEDs and driving circuitry are formed by a combination of processes from a single crystal block of silicon. The crystal is very large.

The collimators may be formed by altering the crystalline structure of the silicon to change its index of refraction at specific locations by ion bombardment, x-ray exposure, or with laser light.

The shutter aperture pattern could be masked directly onto the front of the block. A face plate would contain the liquid.

LEDs may be doped into the back of the collimator structure. The crystal would be exposed to a variety of doping gasses and compounds during growth.

While the foregoing description and drawings represent the preferred embodiments of the present invention, it will be understood that various changes and modifications may be made without departing from the spirit and scope of the present invention. The present invention is limited only by the appended claims.

What is claimed is:

1. A video display having a display area of a width W and a height H, comprising:
   light producing means for producing a column of light which substantially spans the height of the display area and is substantially narrower than the width thereof, said light producing means including light source means for emitting the light and including means for directing and reflecting the light to form said column;
   shutter means arranged so that the light produced is incident thereon for selectively controlling transmission of at least a portion of the incident light, said shutter means having a plurality of vertically aligned, elongated horizontal strip apertures selectively controllable to transmit and block said light; and
   sweeping means for sweeping the light produced substantially across the width of the display area.

2. A video display having a display area of a width w and a height H, comprising:
   light producing means for producing a column of light which substantially spans the height of the display area and is substantially narrower than the width thereof;
   shutter means arranged so that the light produced is incident thereon for selectively controlling transmission of at least a portion of the incident light, said shutter means having a plurality of vertically aligned, elongated horizontal strip apertures selectively controllable to transmit and block said light; and
   sweeping means for sweeping the light produced substantially across the width of the display area, said light producing means including:
   light source means for emitting the light; and
   a plurality of elongated optical light guide means arranged side by side across at least a portion of the width of the display area for guiding light from said light source means, each guide means having an entrance surface and a front face, each front face extending over at least a portion of the height of said display, each entrance surface being positioned to receive emitted light from said light source means, said optical light guide means directing the light from said entrance surface to said front surface, said shutter means being located in front to said front faces so as to receive at least a portion of the light escaping from said front faces.

3. The display as claimed in claim 2, wherein said plurality of optical light guide means are collimators having first and second mirrored surfaces facing each other and being positioned and constructed such that the light entering said collimators through said entrance surface diverges and comes into contact with said first mirrored surface and is reflected therefrom so as to come into contact with said second mirrored surface, from which the light is reflected through the front face of said collimators as light rays substantially parallel to each other.

4. The display as claimed in claim 3, wherein said first mirrored surface is convex parabolic in shape and said second mirrored surface is concave hyperbolic in shape.

5. The display as claimed in claim 3, wherein at least one of said collimators has cladding members along side surfaces that are adjacent to other collimators, said cladding members having a reflective surface facing into said collimators for reflecting the light, said cladding members preventing light interference between said collimators.

6. The display as claimed in claim 2, wherein said shutter means is a liquid crystal display.

7. The display as claimed in claim 2, wherein said light sources are light emitting diodes.

8. The display as claimed in claim 2, wherein said shutter means is placed against said optical light guide means so as to minimize light loss.

9. The display as claimed in claim 2, wherein said apertures extend across the width of said display area and are located one above the other, said sweeping means comprising:
   horizontal sweep means for activating said light sources so as to illuminate, in a predetermined sequence, each of said optical light guide means with light from said light source means; and
   vertical sweep means for selectively opening said apertures to allow light to pass therethrough in a predetermined sequence, said apertures being normally closed.

10. The display as claimed in claim 9, further comprising:
    means for interlacing an image scan to give the appearance of a continuous moving image, said vertical sweep means being responsive to said interlacing means to selectively allow light to pass through a first field of said apertures extending at least partly over the width and height of said display, and said vertical sweep means allowing light to pass through a second field of said apertures of similar size to, but offset from, the first field so as to cause said fields to interlace each other.

11. The display as claimed in claim 2, further comprising:
    a synchronization separator for separating composite video signals into vertical sync pulses, horizontal sync pulses and video intensity and color signals;
    video amplifiers for converting the video intensity signals into amplitudes corresponding to a plurality of color intensities;
    clock circuit means for dividing up the period between horizontal sync pulses by the number of optical light guide means so as to form clocked horizontal pulses and for dividing up the period between vertical sync pulses so as to form clocked vertical pulses;
    counter circuit means responsive to said clock circuit means for counting the number of clocked horizontal pulses and the number of clocked vertical pulses; and
    means for actuating the light sources to illuminate the optical light guide means with light in response to the counter circuit means counting the clocked horizontal pulses and for actuating the apertures in response to said counter circuit means counting the clocked vertical pulses.

12. The display as claimed in claim 11, further comprising:

persistence means located across the light source means for keeping the light source means activated for a predetermined period of time in response to said actuating means.

13. The display as claimed in claim 2, wherein said light source means includes a vacuum tube having excitable phosphor and means for exciting said phosphor to produce the light.

14. The display as claimed in claim 13, wherein said phosphor exciting means includes means for varying the flow of electrons, means for focussing said electrons into beams directed toward said phosphor and means for selectively blocking said beams from reaching said phosphor.

15. The display as claimed in claim 14, wherein said phosphor exciting means includes means for suppressing the flow of electrons toward said phosphor.

16. The display as claimed in claim 14, wherein said means for varying includes a cathode and an anode, said phosphor being coated on said anode, said cathode generating said electrons.

17. The display as claimed in claim 14, wherein said light source means includes a plurality of strips of phosphor each strip being excitable for giving off different colors of light, said varying means including a plurality of cathodes generating the electrons, said focussing means being arranged so that varying the intensity of the electrons from a respective one of said cathodes by said varying means causes a change in an amount of light given off from a respective one of said phosphor strips.

18. The display as claimed in claim 14, wherein said means for selectively blocking includes a plurality of blocking elements, said blocking elements being aligned with said plurality of optical guide means, respectively.

19. The display as claimed in claim 2, wherein said light source means includes:
light emitting elements;
a rotatable mirror positioned to intercept light emitted from said light emitting elements;
means for rotating said rotatable mirror, said light emitting elements emitting light to strike said rotatable mirror, said mirror reflecting the light, said rotating means rotating said rotatable mirror so as to direct the light reflecting off said rotatable mirror to the entrance surface of each of said optical light guide means.

20. The display as claimed in claim 19, wherein said entrance surface of each of said optical guide means is angled relative to said rotatable mirror so that the light reaching the entrance surface refracts into said optical guide means as light rays that travel parallel to each other in each of said plurality of optical guide means.

21. The display as claimed in claim 19, wherein said light emitting element is a laser.

22. The display as claimed in claim 2, wherein said light source means includes a light emitting element and a piezoelectric flapper mirror, which responds piezoelectrically to reflect light emitted from said light emitting surface to the entrance surface of each of said plurality of optical light guide means individually.

23. The display as claimed in claim 22, wherein said entrance surface of each of said optical guide means is angled relative to said flapper mirror so that the light reaching the entrance surface refracts into said optical light guide means as light rays which travel parallel to each other in each of said optical light guide means.

24. The display as claimed in claim 22, wherein said flapper mirror is composed of polyvinylfluoride.

25. The display as claimed in claim 2, wherein all of said light source means, optical light guide means and shutter means are a single piece construction.

26. The display as claimed in claim 2, wherein said light source means includes groups of different colored light emitting elements, said elements of said groups all respectively directing their emitted light into the entrance surfaces of corresponding optical light guide means.

27. A video display having a display area of a width W and a height H, comprising:
light producing means for producing a column of light which substantially spans the height of the display area and is substantially narrower than the width thereof;
shutter means arranged so that the light produced is incident thereon for selectively controlling transmission of at least a portion of the incident light, said shutter means having a plurality of vertically aligned, elongated horizontal strip apertures selectively controllable to transmit and block said light; and
sweeping means for sweeping the light produced substantially across the width of the display area said light producing means including a mirror reflecting the light to said shutter means, said sweeping means including means for moving said mirror so that the light reflecting off the mirror sweeps across the display.

28. The display according to claim 27, wherein said mirror is a rotatable mirror.

29. The display according to claim 27, wherein said mirror is a piezoelectric flapper mirror.

30. The display according to claim 4, wherein said collimator also has a lens arranged at said entrance surface to focus light from outside said collimator so as to strike against said first mirrored surface.

31. A color video flat screen display system having a display area of width W and height H, comprising:
a plurality of groups of three light emitting diodes, each of said diodes in each group emitting light which differs in color from each other;
a plurality of light guide means each for collimating the light emitted by the diodes of a corresponding group to a respective front face of said light guide means which has a height at least equivalent to a portion of the height of said display area, said plurality of light guide means being located side by side across at least a portion of the width of the display area; and
a liquid crystal display having a plurality of horizontal apertures extending across the width of the display and being located one above the other.

32. The color flat screen display as claimed in claim 31, wherein the front face of each light guide means is the width of a picture element.

33. The color flat screen display as claimed in claim 32, wherein the height of the apertures corresponds to a picture element.

34. The color flat screen display as claimed in claim 33, wherein each light guide means is a collimator.

35. The color flat screen display as claimed in claim 31 further comprising:
horizontal sweep means for activating said light sources and illuminating, in a predetermined sequence, each of said light guide means with light from said light sources; and vertical sweep means for selectively allowing light to pass through said apertures in a predetermined sequence.

36. The color flat screen display as claimed in claim 35, further comprising:

means for interlacing to give the appearance of a continuous moving image, said vertical sweep means being responsive to said interlacing means to selectively allow light to pass through a first field of said apertures extending substantially over at least a portion of the width and height of said display, and then to allow light to pass through a second field of said apertures of similar size to, but offset from, the first field so as to cause said fields to interlace each other.

37. The color flat screen display as claimed in claim 31, further comprising:

a synchronization separator for separating composite video signals into vertical sync pulses, horizontal sync pulses and video intensity and color signals;

video amplifiers for converting the video intensity signals into amplitudes corresponding to a plurality of color intensities;

clock circuit means for dividing up the period between horizontal sync pulses by the number of light guide means so as to form clocked horizontal pulses and for dividing up the period between vertical sync pulses by the number of apertures so as to form clocked vertical pulses;

counter circuit means responsive to said clock circuit means for counting the number of clocked horizontal pulses and the number of clocked vertical pulses; and means for actuating the light sources to illuminate the light guide means in response to the counter circuit means counting the clocked horizontal pulses and for actuating the apertures in response to said counter circuit means counting the clocked vertical pulses.

38. A method of creating video display having a display area of a width W and a height H, comprising:

producing a column of light which substantially spans the height of the display area and is substantially narrower than the width thereof, the step of producing including directing and reflecting the light to form the column;

selectively controlling transmission of at least a portion of said light to said display area through a plurality of vertically aligned, elongated horizontal strip apertures; and sweeping the produced light substantially across the width of the display area.

39. A method of creating video display having a display are of a width W and a height H, comprising:

producing a column of light which substantially spans the height of the display area and is substantially narrower than the width thereof;

selectively controlling transmission of at least a portion of said light to said display area through a plurality of vertically aligned, elongated horizontal strip apertures; and sweeping the produced light substantially across the width of the display area the step of producing including diverging light from groups of different colored light sources and directing the diverged light to the display area.

40. The method as claimed in claim 38, wherein the step of selectively controlling transmission includes rearranging molecules of a liquid crystal display so that the liquid crystal display serves as a shutter.

41. The method as claimed in claim 38, wherein the step of sweeping includes selectively illuminating portions of the display area by directing the produced light through optical guides in sequence, and the step of selectively controlling transmission includes activating apertures in sequence to allow the light to pass.

42. The method as claimed in claim 41, wherein the step of sweeping includes activating every other aperture in sequence to interlace a plurality of fields of the display which are offset from one another.

43. The method as claimed in claim 39, wherein the step of producing includes collimating the light through optical guides.

44. The method as claimed in claim 43, wherein the step of sweeping includes reflecting the produced light substantially across the width of the display to each entrance surface of optical light guides.

45. The method as claimed in claim 44, wherein the step of producing includes exciting phosphor to produce the light by bombarding the phosphor with electrons at selected areas of the phosphor.

46. A collimator, comprising:

first and second mirrored surfaces in spaced facing relationship; and a front face of substantially greater height than width, said first mirrored surface being shaped and arranged so that light incident on said first mirrored surface is diverged and reflected to said second mirrored surface, said second mirrored surface being shaped and arranged so that the diverged and reflected light incident thereon is collimated and reflected through said front face.

47. The collimator as claimed in claim 46, wherein said first mirrored surface is parabolic and said second mirrored surface is hyperbolic.

48. The collimator as claimed in claim 46, wherein said mirrored surfaces are elliptical.

49. The collimator as claimed in claim 46, wherein said mirrored surfaces are circular.

50. A display as claimed in claim 1, wherein said sweeping means sweeps the light across the width of said display at a horizontal scan rate, said shutter means opening and closing said strip apertures in sequence over the height of said display at a vertical scan rate, said horizontal scan rate being faster then said vertical scan rate.

51. A display as claimed in claim 1, further comprising:

separating means for separating composite video signals into vertical and horizontal sync pulses and video intensity and color signals;

converting means for converting the video intensity signals into amplitudes corresponding to a plurality of color intensities;

clock means for dividing up the period between horizontal sync pulses into clocked horizontal pulses and for dividing up the period between vertical sync pulses into clocked vertical pulses;

counter means responsive to said clock means for counting a number of clocked horizontal pulses; and actuating means for actuating said light source means to form said column of light in response to said counter means counting the clocked horizontal pulses and for actuating the apertures in response to said counter means counting the clocked vertical pulses.

52. A display as claimed in claim 1, wherein said light producing means including a plurality of light sources each producing a light of a different color, said light sources being arranged for mixing the light together prior to producing said column of light.

53. A video display having a display area of a width W and a height H, comprising:
  light producing means for producing a column of light which substantially spans the height of the display area and is substantially narrower than the width thereof;
  shutter means arranged so that the light produced is incident thereon for selectively controlling transmission of at least a portion of the incident light, said shutter means having a plurality of vertically aligned, elongated horizontal strip apertures selectively controllable to transmit and block said light;
  sweeping means for sweeping the light produced substantially across the width of the display area;
  separating means for separating composite video signals into vertical and horizontal sync pulses and video intensity and color signals;
  converting means for converting the video intensity signals into amplitudes corresponding to a plurality of color intensities;
  clock means for dividing up the period between horizontal sync pulses into clocked horizontal pulses and for dividing up the period between vertical sync pulses into clocked vertical pulses;
  counter means responsive to said clock means for counting a number of clocked horizontal pulses; and
  actuating means for actuating said light source means to form said column of light in response to said counter means counting the clocked horizontal pulses and for actuating the apertures in response to said counter means counting the clocked vertical pulses.

* * * * *